(12) United States Patent
Yamaguchi et al.

(10) Patent No.: US 8,653,812 B2
(45) Date of Patent: Feb. 18, 2014

(54) SHEET IDENTIFYING APPARATUS, IMAGE READING SYSTEM, SHEET SHREDDING SYSTEM, NON-TRANSITORY COMPUTER-READABLE MEDIUM, AND SHEET INDENTIFYING METHOD

(75) Inventors: Shoji Yamaguchi, Kanagawa (JP); Seigo Makida, Kanagawa (JP); Katsumi Sakamaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 354 days.

(21) Appl. No.: 13/220,122

(22) Filed: Aug. 29, 2011

(65) Prior Publication Data

US 2012/0249131 A1 Oct. 4, 2012

(30) Foreign Application Priority Data

Mar. 28, 2011 (JP) ................................. 2011-070888

(51) Int. Cl.
*G01R 33/02* (2006.01)
(52) U.S. Cl.
USPC ............................ 324/244; 324/260; 324/261
(58) Field of Classification Search
USPC .......................................... 324/244, 260, 261
See application file for complete search history.

(56) References Cited

U.S. PATENT DOCUMENTS

| 4,593,184 A * | 6/1986 | Bryce et al. ................... 235/449 |
| 4,994,939 A | 2/1991 | Rubertus et al. |
| 5,450,937 A * | 9/1995 | Ono et al. ...................... 194/203 |
| 2007/0216405 A1* | 9/2007 | Takeuchi et al. .............. 324/228 |
| 2009/0145730 A1* | 6/2009 | Aizawa et al. ........... 198/810.02 |
| 2012/0002313 A1* | 1/2012 | Miyabe et al. .................... 360/2 |

FOREIGN PATENT DOCUMENTS

JP A-2008-46904 2/2008

* cited by examiner

*Primary Examiner* — Jay Patidar
(74) *Attorney, Agent, or Firm* — Oliff PLC

(57) ABSTRACT

A sheet identifying apparatus includes: an excitation coil disposed upstream in a passage through which a sheet inserted into an input port passes and wound on an outer periphery of the passage; a first output unit that detects a magnetization variation of a magnetic element due to the excited excitation coil when the sheet having the magnetic element passes through a region of the passage where the excitation coil is disposed in a state where an AC current is applied to the excitation coil and that outputs a first detection signal when the magnetization variation is detected; and a second output unit that detects that the sheet passes through a region downstream in the passage on the basis of a characteristic of the sheet without using the magnetic element and that outputs a second detection signal when detecting that the sheet passes through the region.

16 Claims, 16 Drawing Sheets

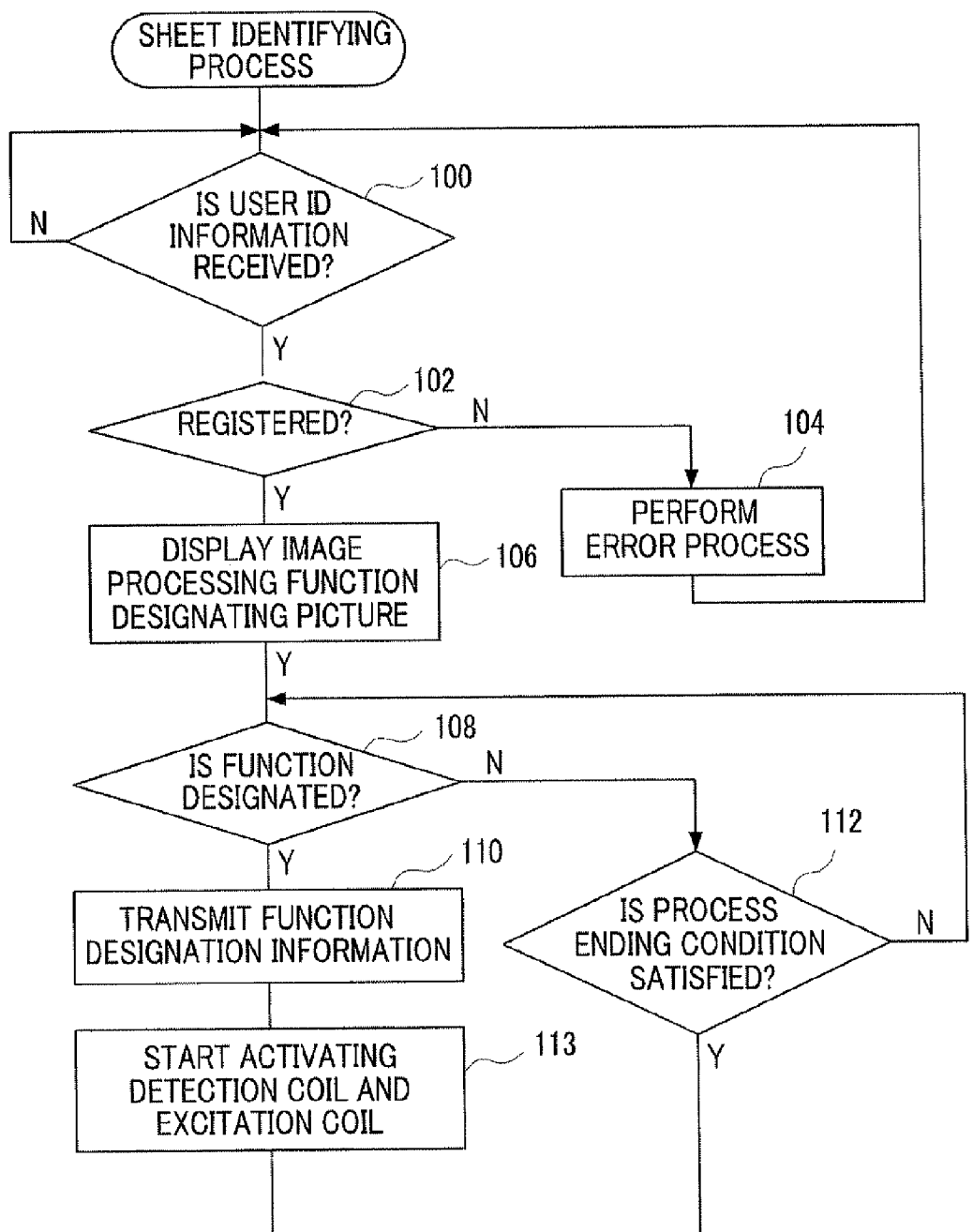

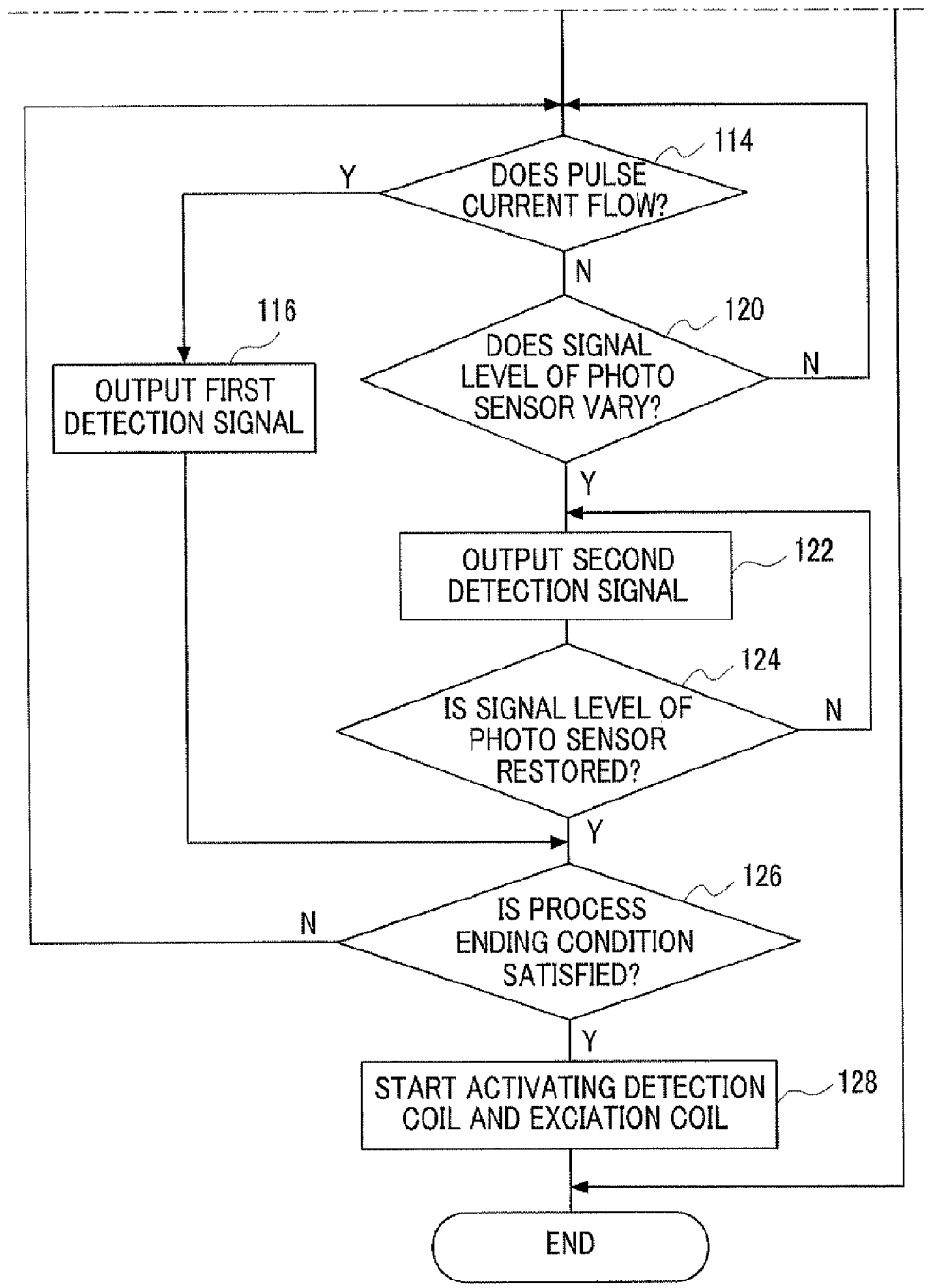

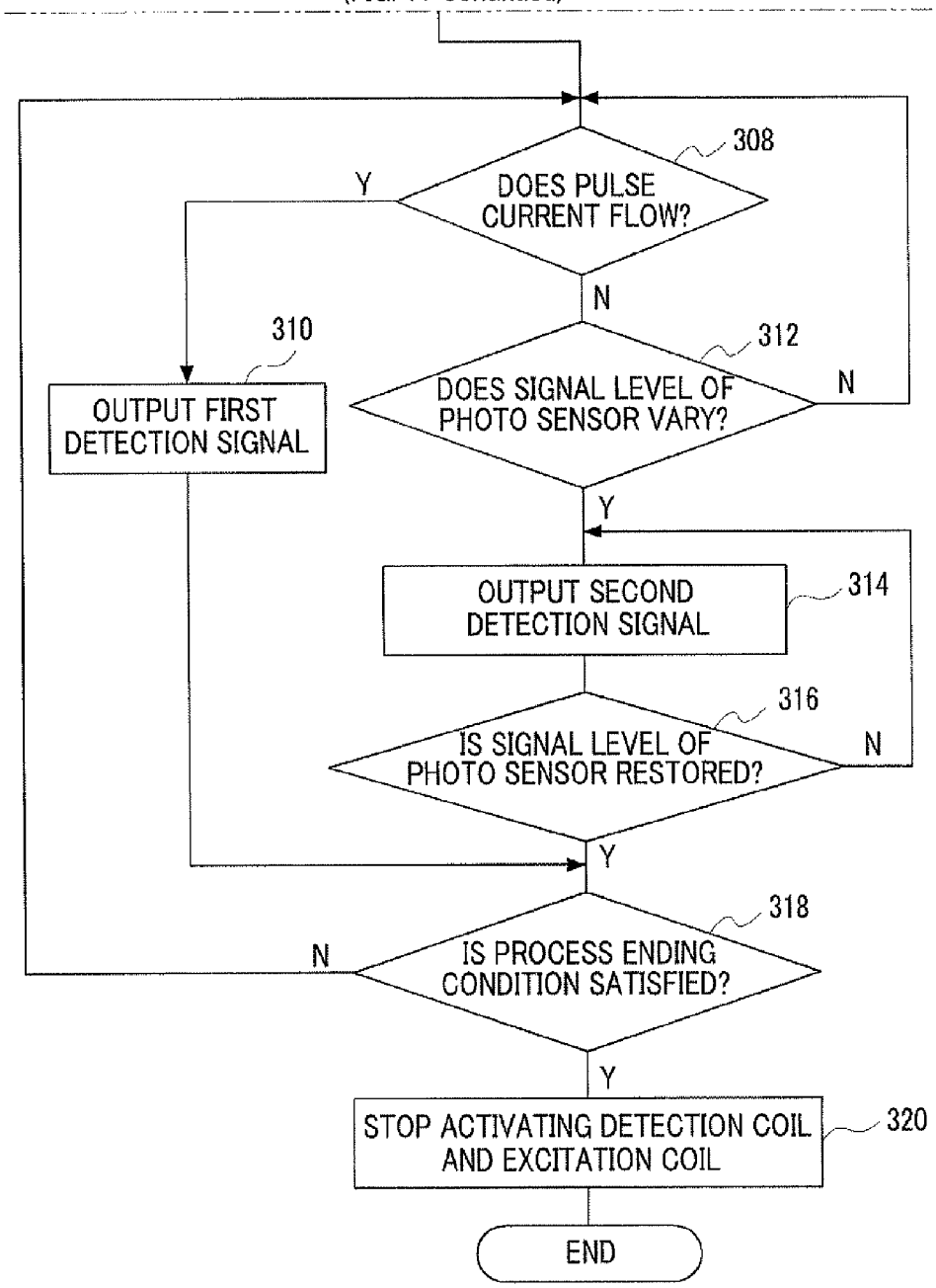

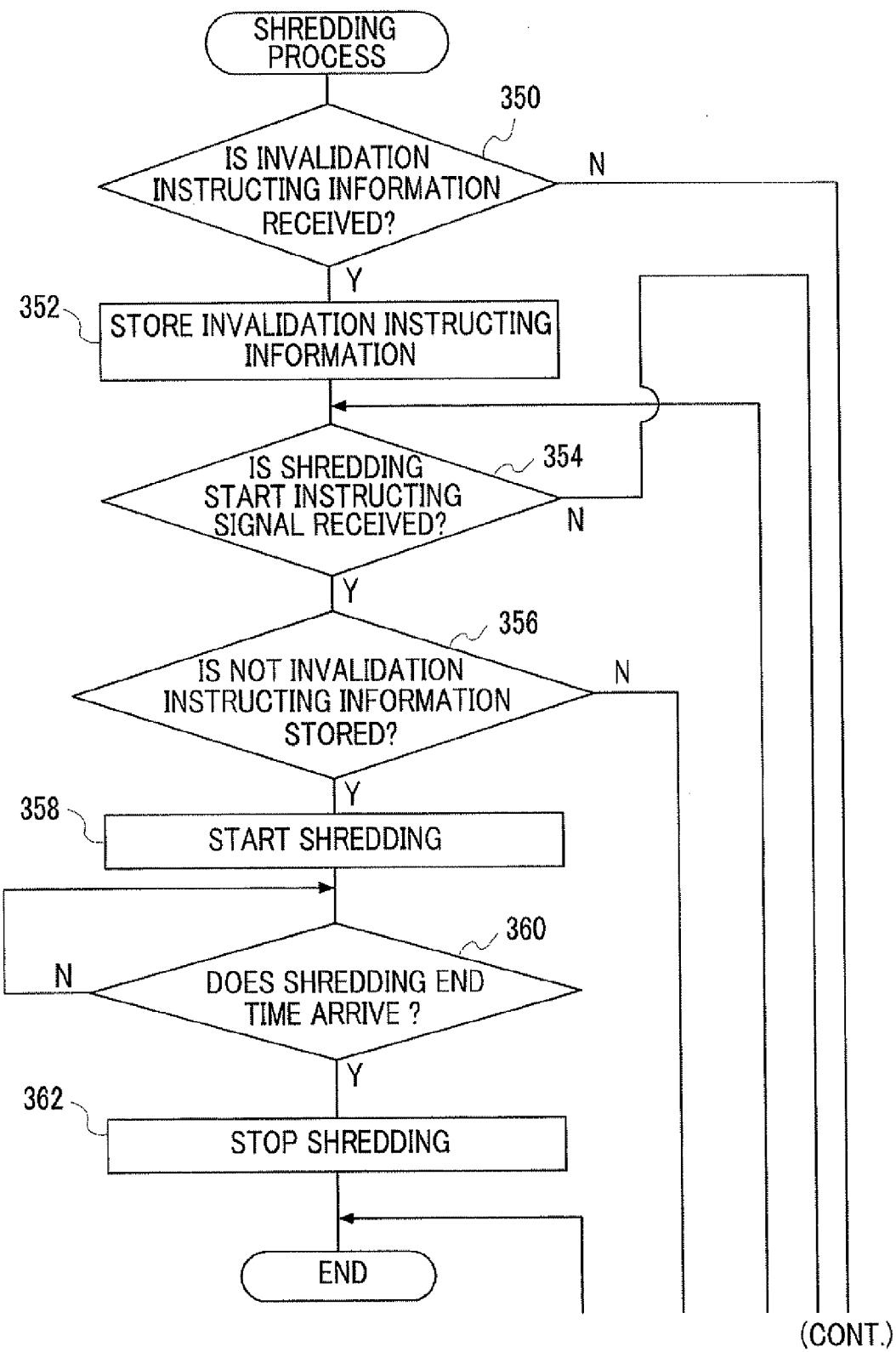

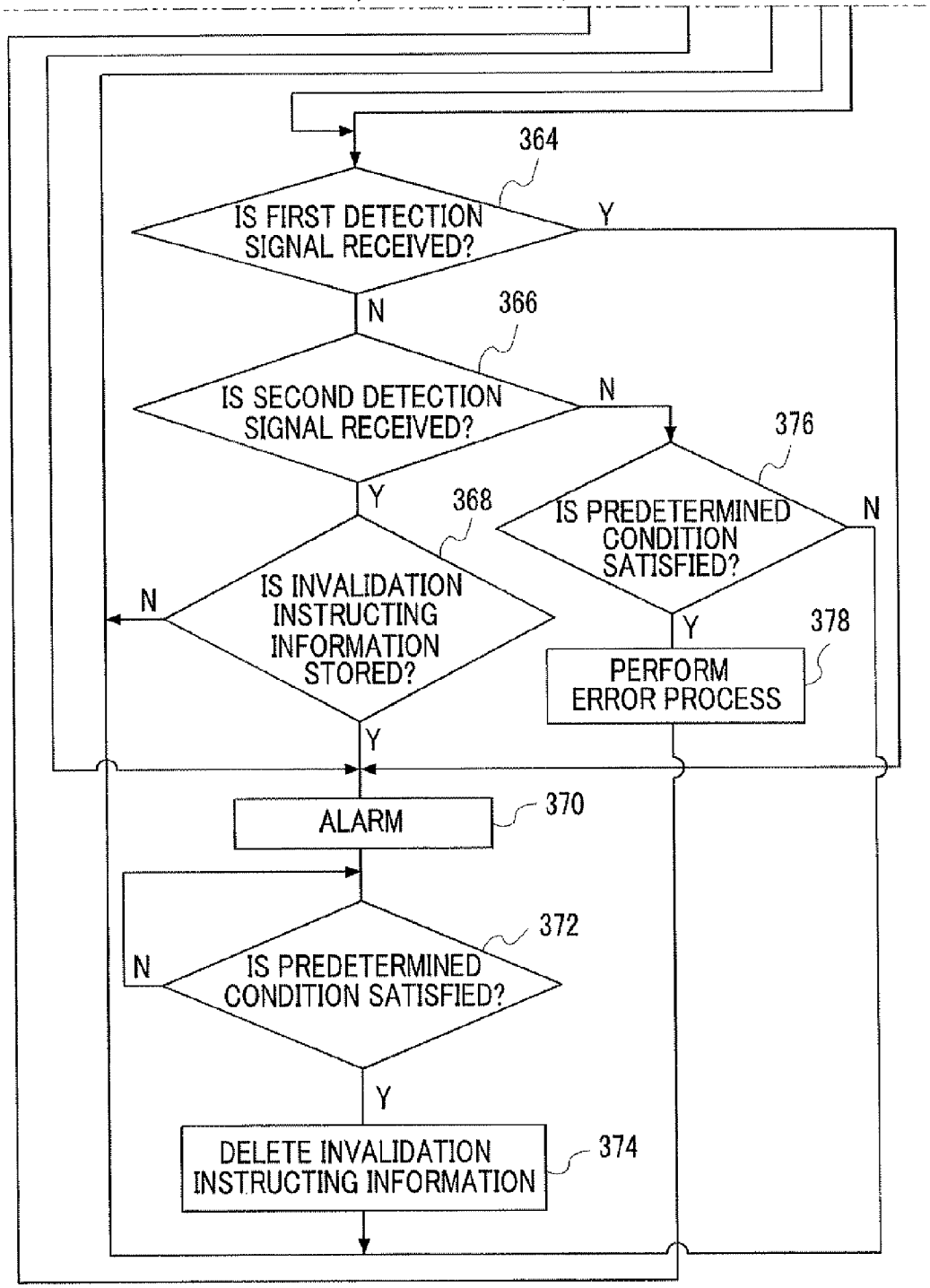
(FIG. 12 Continued)

SHEET IDENTIFYING APPARATUS, IMAGE READING SYSTEM, SHEET SHREDDING SYSTEM, NON-TRANSITORY COMPUTER-READABLE MEDIUM, AND SHEET INDENTIFYING METHOD

CROSS-REFERENCE TO RELATED APPLICATIONS

This application is based on and claims priority under 35 USC 119 from Japanese Patent Application No 2011-070888 filed Mar. 28, 2011.

BACKGROUND

Technical Field

The present invention relates to a sheet identifying apparatus, an image reading system, a sheet shredding system, a non-transitory computer-readable medium, and a sheet identifying method.

SUMMARY

According to an aspect of the invention, there is provided a sheet identifying apparatus for detecting at least one of a magnetic element in a sheet and a predetermined condition of the sheet, the sheet identifying apparatus including: a passage having an input port through which the sheet is inserted; an excitation coil disposed downstream of the input port and wound on an outer periphery of at least a portion of the passage; a first output unit that detects magnetization variation of the magnetic element in a first region of the passage based on excitation of the excitation coil, wherein an AC current is applied to the excitation coil, and the first output unit outputs a first detection signal when the magnetization variation is detected; and a second output unit that detects that the sheet passes through a second region in the passage on the basis of a characteristic of the sheet without using the magnetic element and that outputs a second detection signal when detecting that the sheet passes through the second region.

BRIEF DESCRIPTION OF THE DRAWINGS

Exemplary embodiments of the present invention will be described in detail based on the following figures, wherein:

FIG. 5 is a flowchart illustrating the flow of processes of a sheet identification processing program according to the first exemplary embodiment;

FIG. 12 is a flowchart illustrating the flow of processes of a sheet shredding and processing program according to the third exemplary embodiment.

DETAILED DESCRIPTION

Hereinafter, exemplary embodiments of the invention will be described with reference to the accompanying drawings. In the specification, "sheet" means a recording medium such as an overhead projector (OHP) sheet or a film on which an image may be formed, in addition to a sheet of paper formed of vegetable fiber as a main material.

First Exemplary Embodiment

Figure 1:
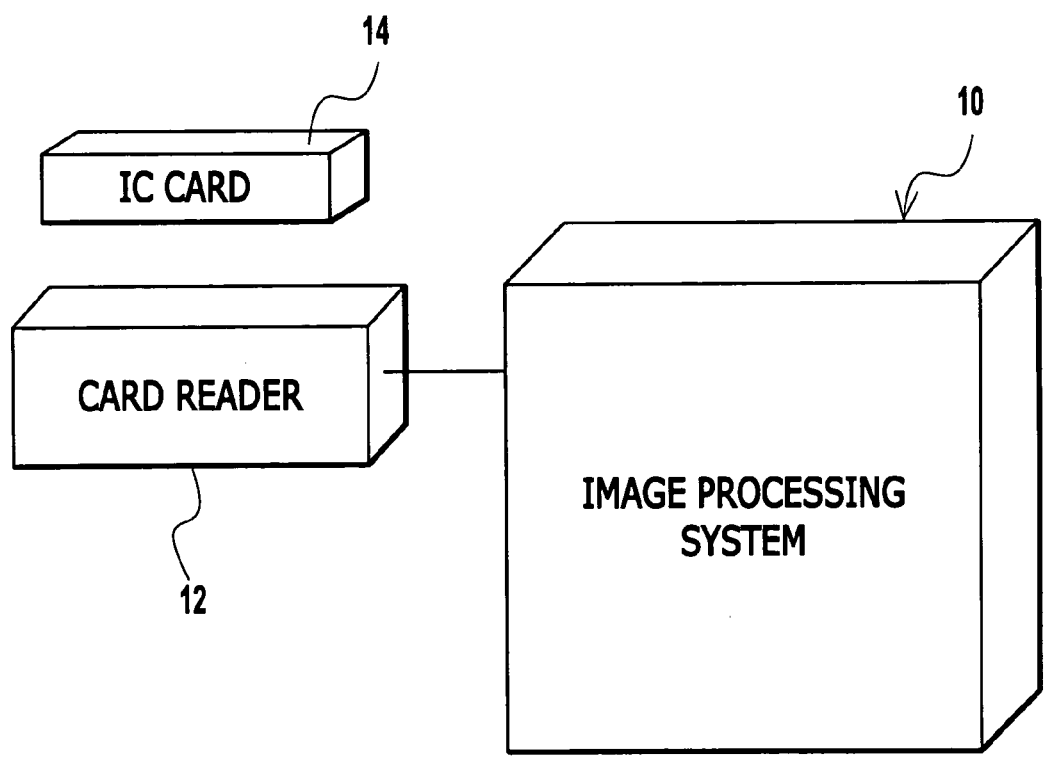
FIG. 1 is a diagram schematically illustrating the configuration of an image processing system according to a first exemplary embodiment of the invention and the periphery thereof.

FIG. 1 is a diagram schematically illustrating the configuration of an image processing system 10 according to a first exemplary embodiment of the invention and the periphery thereof. The image processing system 10 shown in FIG. 1 has a scanning function of reading an image from a sheet located at a predetermined reading position and acquiring image information indicating the read image, an image recording function of recording an image on a sheet by the use of an electrophotographic method, and a facsimile (hereinafter, referred to as "FAX") function of transmitting and receiving a facsimile telegram. When it is not necessary to distinguish the scanning function, the image recording function, and the FAX function from each other, they are referred to as an "image processing function".

The image processing system 10 further has an authentication function of authenticating a specific user so as to provide a service based on the image processing function to the specific user. In order to realize the authentication function, a card reader 12 is electrically connected to the image processing system 10 via a communication cable (not shown in the drawing). The card reader 12 serves to read user identification information from an IC card 14 in which the user identification information indicating a user registered in advance as a regular user of the image processing system 10 is stored in advance. In the first exemplary embodiment, the IC card reader is used as the card reader 12, but the invention is not limited to the IC card reader. A magnetic card reader may be used when a magnetic card is used instead of the IC card 14, and an RFID reader wirelessly communicating with an RFID may be used when a card having a radio frequency identification system (RFID) tag is used as the IC card 14.

Figure 2:
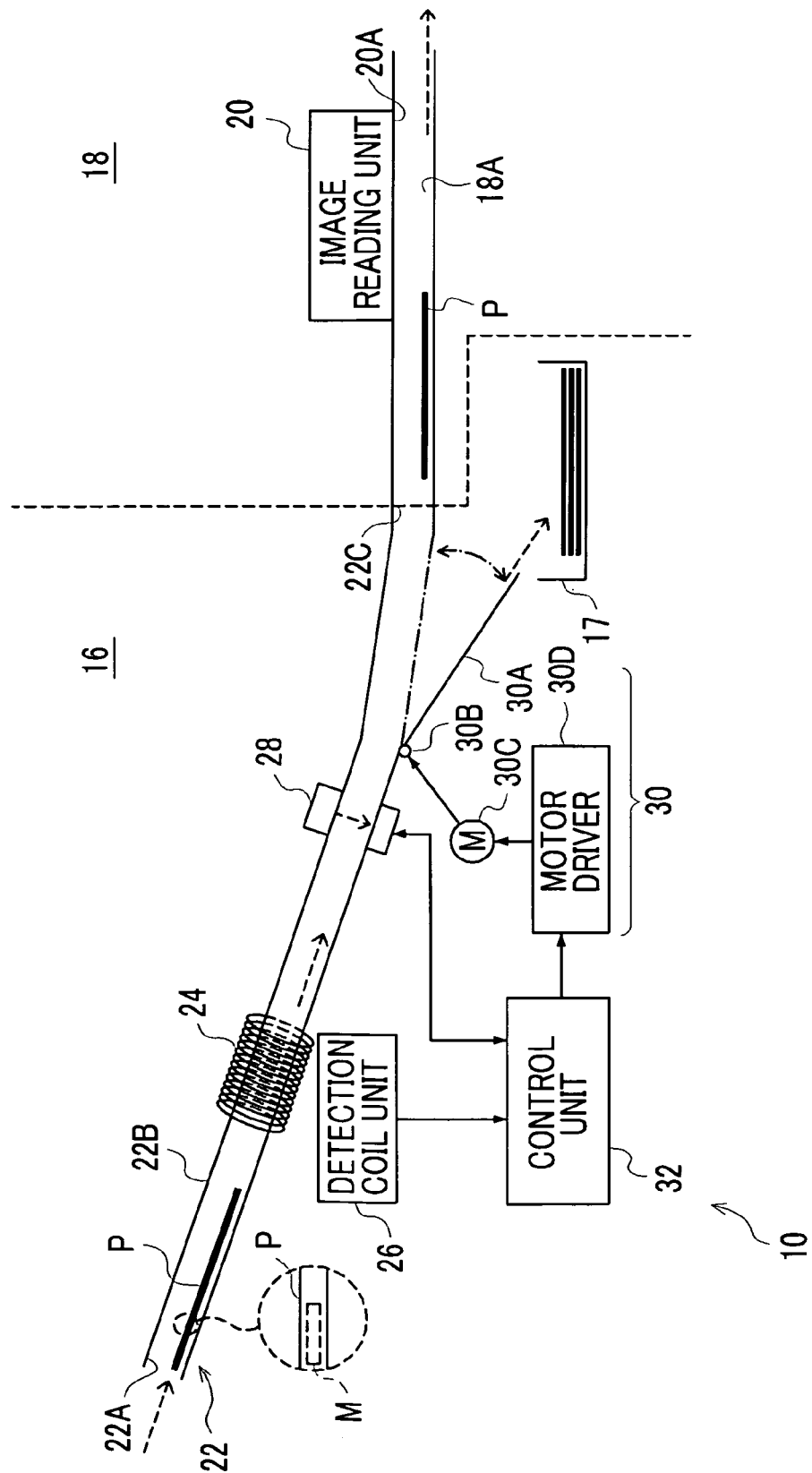
FIG. 2 is a diagram illustrating the partial configuration of the image processing system according to the first exemplary embodiment.

FIG. 2 is a diagram illustrating the partial configuration of the image processing system 10 according to the first exemplary embodiment. As shown in FIG. 2, the image processing system 10 includes a sheet identifying apparatus 16 and an image processing apparatus 18. The sheet identifying apparatus 16 serves to identify a sheet P having a confidential document recorded thereon. The sheet identifying apparatus 16 has a sorting function of distinguishing a sheet P having a confidential document recorded thereon (hereinafter, referred to as a "confidential sheet P") and a sheet P not having a confidential document recorded thereon (hereinafter, referred to as a "non-confidential sheet P"), sending the non-confidential sheet P to the image processing apparatus 18, and discharging the confidential sheet P to a sheet discharge tray 17. Here, "confidential document" means a document determined to be a company document that should not be outside the limits of the company and means a document having a higher confidence level than other documents.

The image processing apparatus 18 has an image processing function and activates the image recording function and the FAX function on the basis of the image information acquired through the use of the scanning function. In order to realize the scanning function, the image processing apparatus 18 includes an image reading unit 20 and a reading region 18A disposed at a predetermined reading position so that a sheet P from which an image should be read by the image reading unit 20 comes into contact with a reading surface 20A. The image reading unit 20 has the reading surface 20A including an imaging device and reads the image of the sheet P by irradiating the sheet P located at the predetermined reading position with light, photoelectrically converting the reflected light from the sheet P by the use of the imaging device disposed on the reading surface 20A to acquire an electrical signal.

The non-confidential sheet P is transported to the reading region 18A from the sheet identifying apparatus 16. The non-confidential sheet P transported to the reading region 18A from the sheet identifying apparatus 16 passes through the reading region 18A and the image of the non-confidential sheet P is read by the image reading unit 20 while passing through the reading region 18A.

The sheet identifying apparatus 16 includes a sheet input and output section 22 receiving a sheet P from the outside and transporting the received sheet P to the image processing apparatus 18. The sheet input and output section 22 includes an input port 22A into which a sheet P is inserted from the outside, a guide passage 22B that communicates with the input port 22A and that guides the sheet P inserted into the input port 22A to the image processing apparatus 18, and an output port 22O that communicates with the guide passage 22B and the reading region 18A of the image processing apparatus 18 and that discharges the sheet P guided by the guide passage 22B to the reading region 18A. The guide passage 22B is sloped down from the input port 22A as a start point to the output port 22O as an end point of the guide passage 22B. Accordingly, the sheet P inserted into the input port 22A slides down the guide passage 22B to the output port 22O under its own weight, is discharged from the output port 22C to the reading region 18A, and passes through the reading region 18A at a predetermined speed.

In the first exemplary embodiment, a sheet in which a magnetic element M having the large Barkhausen effect is embedded is used as the confidential sheet P and the image processing system 10 includes an excitation coil 24 generating an alternating magnetic field and a detection coil unit 26 in which induced current flows due to an external magnetic field so as to detect the magnetic element M included in the confidential sheet P.

The excitation coil 24 is attached to the outer peripheral surface of the guide passage 22B and is formed by winding a metal wire on the outer peripheral surface downstream from the input port 22A of the guide passage 22B and upstream from the center of the guide passage 22B so that the guide passage 22B is disposed in the inside space of the coil.

A transmissive photo sensor 28 is disposed in the guide passage 22B. The photo sensor 28 detects an object (for example, the sheet P) passing through the guide passage 22B without distinguishing a confidential sheet P and a non-confidential sheet P from each other. The photo sensor 28 is disposed at a position which is downstream from the excitation coil 24 and upstream from the output port 22C so that the distance between the end point of the region where the magnetic element M is detected by the excitation coil 24 and the start point of the detection region of the photo sensor 28 is equal to or greater than the length in the longitudinal direction (for example, the longitudinal direction of an A2 sheet) with a predetermined size of the sheet P. Accordingly, regardless of the position in the confidential sheet P where the magnetic element M is present, the confidential sheet P is not detected by the photo sensor 28 without detecting the magnetic element M. In this case, there is a premise that a sheet P with an effective size to be identified by the sheet identifying apparatus 16 is inserted into the input port 22A. That is, a sheet P with a size (a non-premised size) other than the effective size is not detected.

The sheet identifying apparatus 16 includes a sheet sorting device 30 discharging a non-confidential sheet P to the image processing apparatus 18 and discharging a confidential sheet P to the sheet discharge tray 17. The above-mentioned sorting function is performed by the sheet sorting device 30. The sheet sorting device 30 includes a plate 30A, a hinge 30B, a motor 30C, and a motor driver 30D. The plate 30A forms a part of a bottom plate of the guide passage 22B and is disposed downstream from the photo sensor 28. The length in the width direction (a direction substantially perpendicular to the direction in which the sheet P travels in the guide passage 22B) of the plate 30A is set to be greater than the length of the width direction of the sheet P with a predetermined size as a size effective for identifying the sheet P.

The hinge 30B is disposed at an end of the plate 30A close to the photo sensor 28 and rotates so that the plate 30A is switched between a position (an opened position) where the flow channel of the sheet P in the guide passage 22B is opened to the outside and a position (a closed position) where the flow channel of the sheet P in the guide passage 22B is closed from the outside. The motor 30C is connected to the rotating shaft of the hinge 20B and serves as a drive source transmitting a rotation driving force to the rotating shaft so as to rotate the plate 30A between the opened position and the closed position. The motor driver 30D is a drive control circuit controlling the driving of the motor 30C.

The sheet identifying apparatus 16 includes a control unit 32 controlling the overall operation of the sheet identifying apparatus 16. The control unit 32 serves as the first output unit and the second output unit and is connected to the detection coil unit 26, the photo sensor 28, and the motor driver 30. Accordingly, the control unit 32 receives the detection result from the detection coil unit 26, receives the detection result from the photo sensor 28, and controls the motor driver 30D to drive the motor 30C.

In the sheet identifying apparatus 16, the sheet discharge tray 17 receiving a sheet P sorted as the confidential sheet P by the sheet sorting device 30 from the guide passage 22A is disposed at an end (the free end opposite to the fixed end having the hinge 30B disposed therein) of the plate 30A when the plate 30A is located at the opened position. Accordingly, when the plate 30A is located at the opened position, the sheet P sliding down the guide passage 22A from the upstream side is dropped from the guide passage 22A via the plate 30A and is received in the sheet discharge tray 17.

Figure 3:
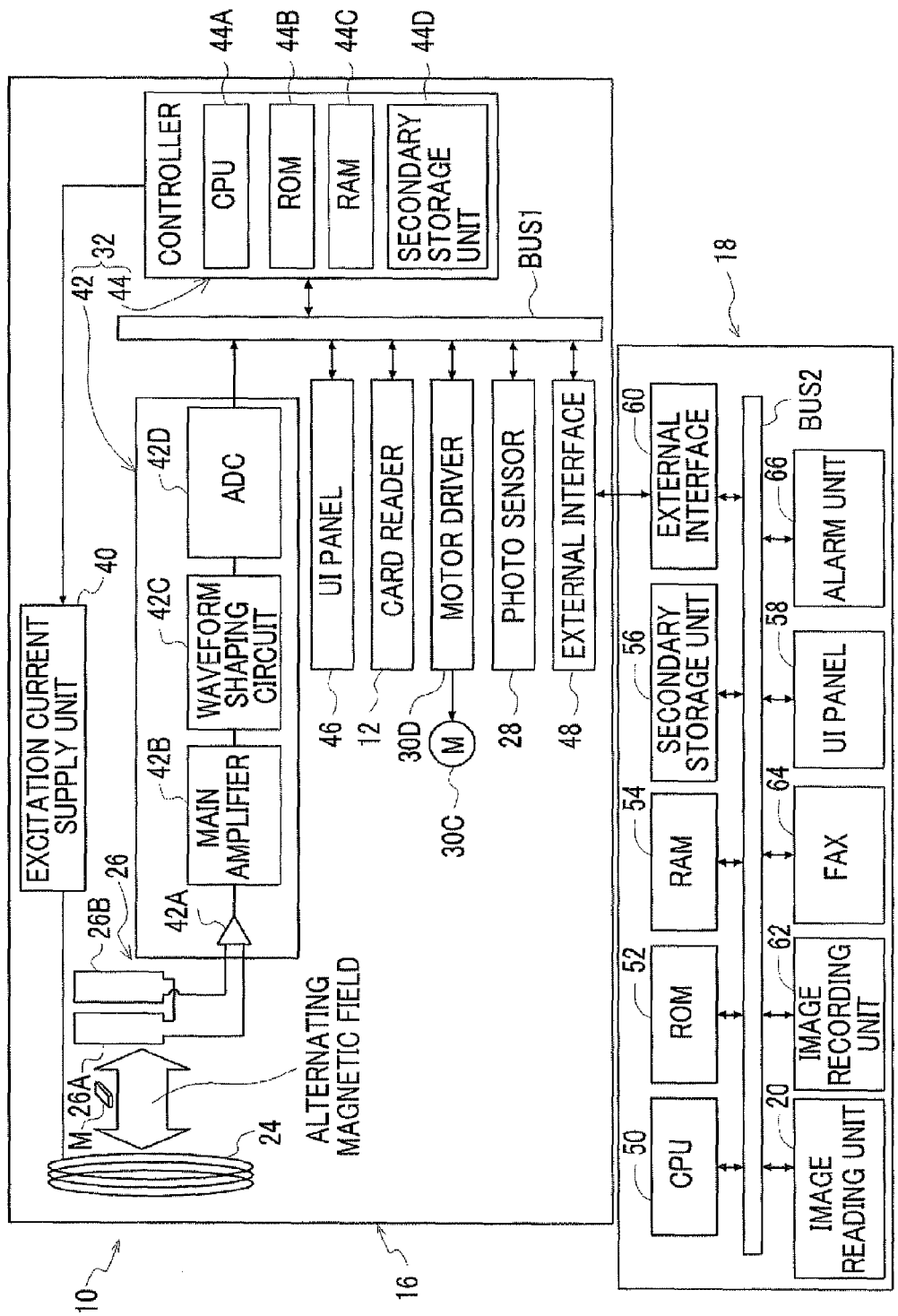
FIG. 3 is a diagram illustrating the partial configuration of an electrical system of the image processing system according to the first exemplary embodiment.

FIG. 3 is a diagram illustrating the partial electrical configuration of the image processing system 10 according to the first exemplary embodiment. As shown in FIG. 3, the sheet identifying apparatus 16 includes an excitation current supply unit 40 supplying an excitation current for generating a magnetic field to the excitation coil 24, a signal processing unit 42 converting an analog electrical signal induced by the detection coil unit 26 into digital information, and a controller 44 being connected to the signal processing unit 42 via a system bus BUS1 and detecting the passing of the magnetic element M on the basis of the digital information acquired by the signal processing unit 42. The control unit 32 includes the signal processing unit 42 and the controller 44.

The detection coil unit 26 includes detection coils 26A and 26B and is disposed close to the excitation coil 24. The detection coils 26A and 26B are disposed to be two-dimensionally adjacent to each other and to have opposite winding directions. An end of the detection coil 26A is connected to the signal processing unit 42 and the other end of the detection coil 26A is connected to an end of the detection coil 26B. The other end of the detection coil 26B is connected to the signal processing unit 42.

On the other hand, the controller 44 is constructed by a microcomputer, includes a central processing unit (CPU) 44A, a read only memory (ROM) 448, a random access memory (RAM) 44C, and a nonvolatile secondary storage unit 44D such as a flash memory, and controls the overall operation of the sheet identifying apparatus 16. The controller 44 is connected to the excitation current supply unit 40 and supplies an AC excitation current to the excitation coil 24.

The excitation coil 24 is excited with the supply of the excitation current from the excitation current supply unit 40 and generates an alternating magnetic field which is a varying magnetic field like a sinusoidal wave. In the detection coils 26A and 26B, an AC current is induced by the alternating magnetic field generated by the excitation coil 24 and a pulse current is generated by the magnetization reversal when a tag including the magnetic element having the large Barkhausen effect is present in the alternating magnetic field.

Figure 4B:
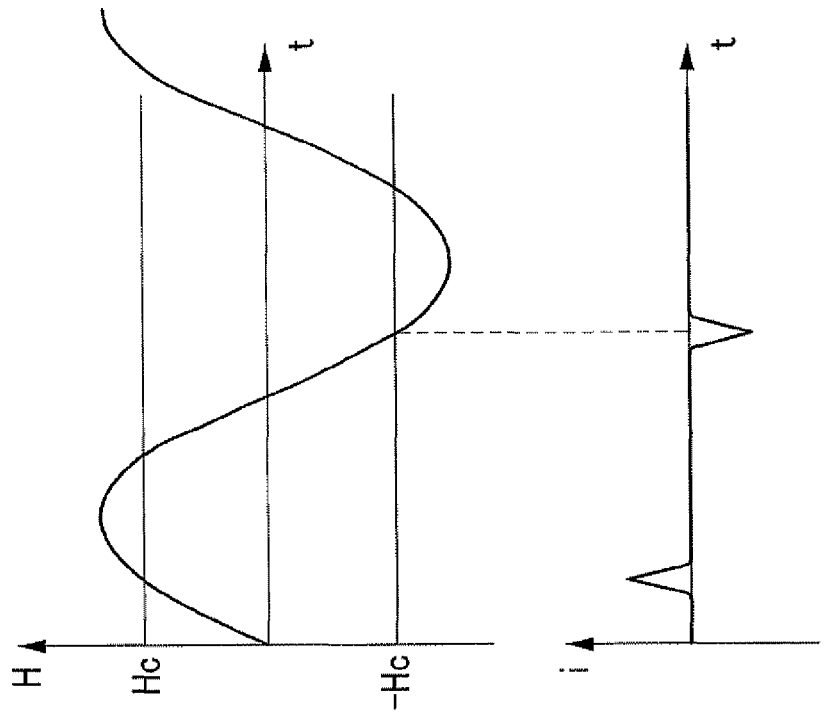
FIGS. 4A and 4B are waveform diagrams illustrating the large Barkhausen effect.
Figure 4A:
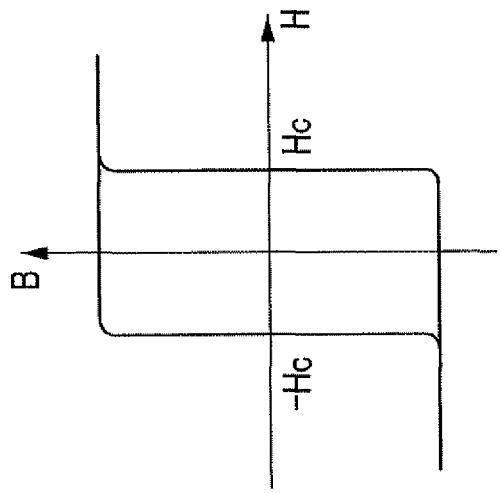

FIGS. 4A and 4B are diagrams illustrating the large Barkhausen effect.

The large Barkhausen effect is a phenomenon that magnetization is suddenly reversed when the B-H characteristic shown in FIG. 4A, that is, the hysteresis loop, is substantially rectangular and a material having a relatively small coercive force (Hc), for example, an amorphous magnetic material formed of Co—Fe—Ni—B—Si, is placed in an alternating magnetic field. A magnetic element having the large Barkhausen effect is reversed in magnetization when a magnetic field having minus and plus intensities larger than predetermined intensities is applied. Accordingly, when an excitation current flows in the excitation coil 24 to generate an alternating magnetic field and a magnetic element is placed in the alternating magnetic field, a pulse-like current flows in the detection coils 26A and 263 disposed close to the magnetic element at the time of magnetization reversal.

For example, when the alternating magnetic field shown in the upper part of FIG. 43 is generated by the excitation coil 24, the pulse current shown in the lower part of FIG. 4B flows in the detection coils 26A and 26B. Here, the current flowing in the detection coils 26A and 263 includes an AC current induced by the alternating magnetic field in addition to the pulse current. Accordingly, in the sheet identifying apparatus 16 according to the first exemplary embodiment, the detection coils 26A and 26B are connected to each other so that the winding directions thereof are reversed so as to cancel the AC current induced in the detection coils 26A and 26B.

The material (magnetic material) of the magnetic element M is typically a permanent magnet and examples thereof include a rare-earth-based magnetic material containing neodymium (Nd)-iron (Fe)-boron (B) as a major component, a magnetic material containing samarium (Sm)-cobalt (Co) as a major component, a alnico-based magnetic material containing aluminum (Al)-nickel (Ni)-cobalt (Co) as a major component, a ferrite-based magnetic material containing barium (Ba) or strontium (Sr) and iron oxide ($Fe_2O_3$) as a major component, soft magnetic materials, and oxide soft magnetic materials. It is preferable that amorphous magnetic materials having a basic composition of Fe—Co—Si or Co—Fe—Ni be used as the magnetic material causing the large Barkhausen effect.

The shape of the magnetic material is not particularly limited, as long as it may appropriately cause the large Barkhausen effect. However, since a length corresponding to a sectional area is necessary to cause the large Barkhausen effect, a linear shape (wire shape) or a belt shape is preferable and a wire shape is more preferable.

when the magnetic material has a wire shape, the minimum diameter thereof required for causing the large Barkhausen effect is preferably equal to or greater than 10 µm. The maximum diameter thereof is not particularly limited. However, when the magnetic material is embedded in a recording medium (sheet), the diameter depends on the thickness of the recording medium to suppress the exposure of the magnetic material from the surface of the recording medium. For example, when the thickness of the recording medium is 90 µm more or less, the diameter is preferably equal to or less than 60 µm and more preferably equal to or less than 50 µm.

The length of the magnetic material is preferably equal to or greater than 5 mm, which is the minimum length required for causing the large Barkhausen effect. As long as the amorphous magnetic material is embedded in the recording medium and is not exposed therefrom, the maximum length of the amorphous magnetic material is not particularly limited, but is preferably equal to or less than 430 mm.

On the other hand, as shown in FIG. 3, the signal processing unit 42 includes a differential amplifier 42A amplifying and outputting a difference between the voltages of both terminals (the signal voltages output from one end of the detection coil 26A and the other end of the detection coil 26B), a main amplifier 42B amplifying the signal output from the differential amplifier 42A at a predetermined amplification rate, a waveform shaping circuit 42C shaping the waveform of the signal output from the main amplifier 42B, and an analog/digital converter (hereinafter, referred to as "ADC") 42D converting the waveform-shaped signal from the waveform shaping circuit 42C into digital information. The signal processing unit 42 may further include a band-pass filter extracting and outputting a signal in a predetermined band corresponding to the pulse current generated due to the magnetization reversal of the magnetic element from the signal acquired by waveform shaping circuit 42C between the waveform shaping circuit 42C and the ADC 42D. In the sheet identifying apparatus 16 according to the first exemplary embodiment, an inverting amplifier is used as the main amplifier 42B, but other amplifiers such as a non-inverting amplifier may be used without being limited to the inverting amplifier.

The sheet identifying apparatus 16 includes a user interface (UI) panel 46 and an external interface 48. The UI panel 46 is constructed by a touch-panel display in which a transmissive touch panel is superimposed on a display or the like, displays a variety of information on the display surface of the display, and receives a variety of information or instructions by allowing a user to touch the touch panel. The external interface 48 is connected to the image processing apparatus 18 via a communication medium such as a communication cable and controls the communication with the image processing apparatus 18 by receiving a variety of information from the image processing apparatus 18 and transmitting a variety of information to the image processing apparatus 18.

The card reader 12, the photo sensor 28, the motor driver 30D, the UI panel 46, and the external interface 48 are connected to each other via the system bus BUS1. Therefore, the controller 44 controls the card reader 12 to read the IC card 14, controls the operation of the photo sensor 28, acquires the detection result (acquires the level variation of the signal output) from the photo sensor 28, controls the motor driver 30D to activate the motor 30C, displays a variety of information on the UI panel 46, receives the details of a user's operation input to the UI panel 46, receives a variety of information from the image processing apparatus 18 via the external interface 48, and transmits a variety of information to the image processing apparatus 18 via the external interface 48.

On the other hand, the image processing apparatus 18 includes a CPU 50, a ROM 52, a RAM 54, a secondary storage unit 56, a UI panel 58, an external interface 60, an image recording unit 62, a FAX 64, and an alarm unit 66. The CPU 50 controls the overall operation of the image processing apparatus 18. The ROM 52 serves as a storage unit storing control programs, various parameters, or the like for controlling the operation of the image processing apparatus 18 in advance. The RAM 54 is used as a work area at the time of executing various programs. The secondary storage unit 56 (for example, a hard disk device) serves to store a variety of information which should be maintained when the power switch of the apparatus is turned off. The UI panel 58 is constructed by a touch-panel display in which a transmissive touch panel is superimposed on a display, displays a variety of information on a display plane of the display, and receives a variety of information or instructions by allowing a user to touch the touch panel. The external interface 60 is connected to the sheet identifying apparatus 16 via a communication medium such as the communication cable, and controls the communication with the sheet identifying apparatus 16 by receiving a variety of information from the sheet identifying apparatus 16 and transmitting a variety of information to the sheet identifying apparatus 16.

The image recording unit 62 serves to record an image corresponding to image information on a sheet P and corresponds to a so-called printer. The FAX 64 transmits an image corresponding to the image information and receives image information. Therefore, the image recording function is realized by activating the image recording unit 26 and the FAX function is realized by activating the FAX 64.

The alarm unit 66 serves to inform a user that the passing of a non-confidential sheet P through the guide passage 22B of the sheet identifying apparatus 16 is detected and informs the user of the passing of a non-confidential sheet P, for example, by turning on a warning lamp of a specific color.

The image reading unit 20, the CPU 50, the ROM 52, the RAM 54, the secondary storage unit 56, the external interface 60, the image recording unit 62, the FAX 64, and the alarm unit 66 are connected to each other via a system bus BUS2. Therefore, the CPU 50 accesses the ROM 58, the RAM 60, and the secondary storage unit 56, displays a variety of information on the UI panel 58, receives the details of the user's operation input to the UI panel 58, receives a variety of information from the sheet identifying apparatus 16 via the external interface 60, transmits a variety of information to the sheet identifying apparatus 16 via the external interface 60, acquires the image information acquired by the image reading unit 20, controls the operation of the image reading unit 20, controls the operation of the image recording unit 62, monitors the operating state of the image recording unit 62, controls the operation of the FAX 64, acquires the image information received by the FAX 64, and controls the operation of the alarm unit 66.

In the image processing system 10 having the above-mentioned configuration, various processes for realizing the image processing function are performed by a software configuration. An example thereof is embodied by causing a computer to execute a program. However, the processes are not limited to the software configuration but may be performed by a hardware configuration or by a combination of a hardware configuration and a software configuration.

A case in which the CPU 44A of the sheet identifying apparatus 16 according to the first exemplary embodiment performs the sheet identifying process by executing the program will be described below. In this case, an example in which the program is stored in advance in the ROM 44B, an example in which the program is provided in a state where it is stored in a recording medium of which details may be read by a computer, or an example in which the program is transmitted via a wired or wireless communication medium may be employed.

FIG. 5 is a flowchart illustrating the flow of processes of a sheet identification processing program which is executed by the CPU 44A of the sheet identifying apparatus 16 when a predetermined condition (for example, a condition that an instruction to start the sheet identifying process is received by the UI panel 46) as a condition for starting the sheet identifying process is satisfied. Here, for the purpose of avoiding confusion, a state in which the plate 30A of the sheet identifying apparatus 16 is located at the closed position will be described.

In step 100 of FIG. 5, it is waited for the card reader 12 to read (receive) user identification information. In step 102, it is determined whether the user identification information received in the process of step 100 is registered user identification information. When the determination result is negative, an error process is performed in step 104 and then the process of step 100 is performed again. An example of the "error process" in step 104 is a process of displaying a message (for example, a message indicating that "You are not registered as a user of this system") indicating that the received user identification information is not registered user identification information on the UI panel 46 for a predetermined time (for example, 5 seconds). A process of lighting a lamp of a specific color or a process of giving an alarm using a sound may be performed instead.

On the other hand, when the determination result in step 102 is affirmative, an image processing function designating picture for designating which of the image processing functions of the image processing apparatus 18 to use is displayed on the UI panel 46 in step 106 and it is determined in step 108 whether any image processing function is designated.

Figure 6:
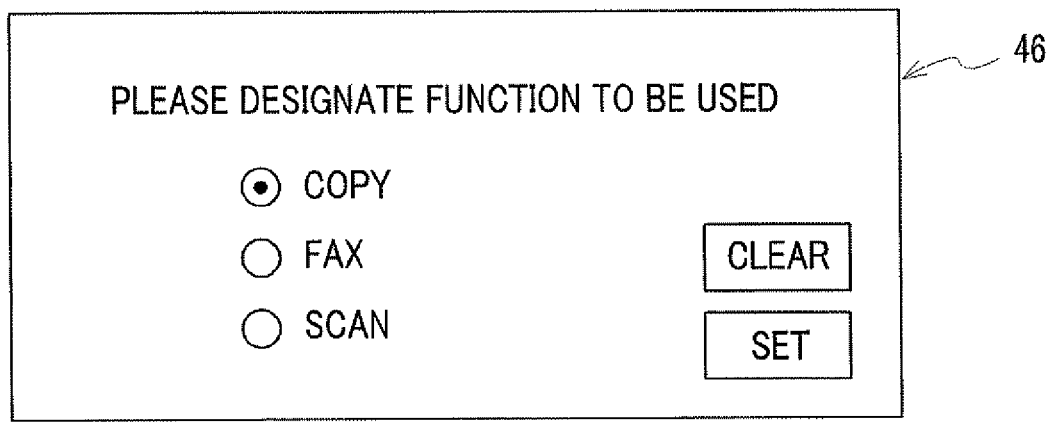
FIG. 6 is a diagram schematically illustrating an image processing function designating picture displayed on a UI panel of a sheet identifying apparatus according to the first exemplary embodiment.

FIG. 6 shows an example of the image processing function designating picture displayed on the display of the UI panel 46. As shown in FIG. 6, a message urging a user to designate an image processing function, like "Please, designate a function to be used", is displayed in the upper part of the image processing function designating picture. An item of "Copy" indicating the image recording function, an item of "FAX" indicating the FAX function, and an item of "Scan" indicating the image reading function are displayed below the message and a radio button is displayed for each image processing function. For example, when a user touches the touch panel of the UI panel 46 and points to designate any item, a check mark is given to the corresponding radio button and the image processing function corresponding to the radio button to which the check mark is given is regularly designated. In the example shown in FIG. 6, since a check mark is given to the radio button corresponding to "Copy", the image reading function is designated. A button of "Clear" is displayed in the image processing function designating picture. For example, when the button of "Clear" is pointed and designated by the user through the use of the touch panel of the UI panel 46 and an image processing function is presently designated, the designation of the image processing function is released and the check mark of the corresponding radio button is erased from the picture. A button of "Decide" is displayed in the image processing function designating picture. For example, when the button of "Decide" is pointed and designated by the user through the use of the touch panel of the UI panel 46 and an image processing function is presently designated, the designation of the image processing function is decided. When no image processing function is not presently designated, the designation of a predetermined image processing function (default image processing function) is decided. When the button of "Decide" in the image processing function designating picture is, for example, pointed and designated to decide an image processing function, the determination result in step 108 is affirmative and the process of step 110 is performed. On the other hand, when no image processing function is not pointed and designated, it is determined in step 112 whether a predetermined condition (for example, a condition that a predetermined time (for example, 60 seconds) passes after the process of step 106 is ended) as a condition of ending the sheet identification processing program is satisfied. The process of step 108 is performed again when the determination result is negative, and the sheet identification processing program is ended when the determination result is affirmative.

In step 110, function designation information indicating the image processing function designated in the process of step 108 is transmitted to the image processing apparatus 18 and then the process of step 113 is performed. When the function designation information transmitted in the process of step 110 is received, the image processing apparatus 18 activates a necessary part for performing the image processing function indicated by the received function designation information. For example, the image reading unit 20 is activated when the function designation information indicates the scanning function, the image reading unit 20 and the image recording unit 62 are activated when the function designation information indicates the image recording function, and the image reading unit 20 and the FAX 64 are activated when the function designation information indicates the FAX function.

In step 113, it is controlled to activate the signal processing unit 42 so as to start the detecting operation of the detection coil unit 26 and the excitation current supply unit 40 is controlled to start the supply of the excitation current to the excitation coil 24. It is determined in step 114 whether a pulse current flows in the detection coil unit 26. When the determination result is affirmative, a first detection signal representing that a confidential sheet P (magnetic element M) is detected is transmitted to the image processing apparatus 18 and the motor driver 30D in step 116 and then the process of step 126 is performed. When receiving the first detection signal transmitted in the process of step 116, the motor driver 30D drives the motor 30C for a predetermined time (For example, 3 seconds) so that the plate 30A rotates from the closed position to the opened position and then reversely rotates to the closed position again to stop at the closed position. Accordingly, when the plate 30A is located at the opened position, the confidential sheet P sliding down the guide passage 22B from the upstream side of the plate 30A is dropped from the guide passage 22B through the plate 30A and is received in the sheet discharge tray 17. When the plate 30A is displaced from the opened position to the closed position, the guide passage 22B is restored to the original state where a sheet P is guided to the image processing apparatus 18.

On the other hand, when the determination result in step 114 is negative, it is determined in step 120 whether the level of the signal output from the photo sensor 28 varies. When the determination result is negative, the process of step 114 is performed again. When the determination result is affirmative, a second detection signal representing that a non-confidential sheet P is detected is transmitted to the image processing apparatus 18 in step 122 and then the process of step 124 is performed. When receiving the second detection signal transmitted in the process of step 122, the image processing apparatus 18 causes the image reading unit 20 to start reading an image and activates the alarm unit 66 to inform the user that the passing of the non-confidential sheet P is detected.

In step 124, it is determined whether the level of the signal output from the photo sensor 28 is restored to the original level (the level before it varies). The process of step 122 is performed again when the determination result is negative, and the process of step 126 is performed when the determination result is affirmative. When the determination result in step 124 is affirmative, the image reading operation of the image reading unit 20 is stopped and the alarming operation of the alarm unit 66 is stopped. The image information indicating the image read by the image reading unit 20 is used for the image processing function activated through the use of the process of step 110. That is, the image information indicating the image read by the image reading unit 20 is stored in a predetermined memory area in the secondary storage unit 56 when the function designation information transmitted in the process of step 110 indicates the scanning function, the image information indicating the image read by the image reading unit 20 is sent to the image recording unit 62 and the image indicated by the image information is recorded on a recording medium (for example, a recording sheet) by the image recording unit 62 when the function designation information transmitted in the process of step 110 indicates the image recording function, and the image information indicating the image read by the image reading unit 20 is sent to the FAX 64 and a FAX telegram including the image information is transmitted to a designation by the FAX 64 when the function designation information transmitted in the process of step 110 indicates the FAX function.

In step 126, it is determined whether a predetermined condition (for example, a condition that a predetermined time (for example, 30 seconds) passes after the process of step 116 is ended or after the determination result in step 124 is affirmative) as the condition for ending the sheet identification processing program is satisfied. When the determination result is negative, the process of step 114 is performed again. When the determination result is affirmative, it is controlled in step 128 to stop the activation of the signal processing unit 42 and the supply of an excitation current to the excitation coil 24, which are started in the process of step 113, and then the sheet identification processing program is ended.

Although it has been stated in the first exemplary embodiment that the user identification information is used to authenticate a user, the invention is not limited to this configuration. The user identification information acquired for the authentication may be stored, for example, as a log (history information) in the secondary storage unit 36 so as to grasp who has input the confidential sheet P to the sheet identifying apparatus 16 in the next time, or the user identification information as the log may be transmitted to an external device (for example, a terminal used by a specific user) as needed.

Second Exemplary Embodiment

Although it has been stated in the first exemplary embodiment that a sheet P is input to the sheet identifying apparatus 16 from the side of the sheet identifying apparatus 16, an example where a sheet P is input to the sheet identifying apparatus 16 in a state where the sheet P is made to fall from the upside of the sheet identifying apparatus 16 under its own weight is described in the second exemplary embodiment. In the second exemplary embodiment, the same elements as in the first exemplary embodiment will be referenced by the same reference numerals and signs and the description thereof will not be repeated. Elements different from those in the first exemplary embodiment will be described below.

Figure 7:
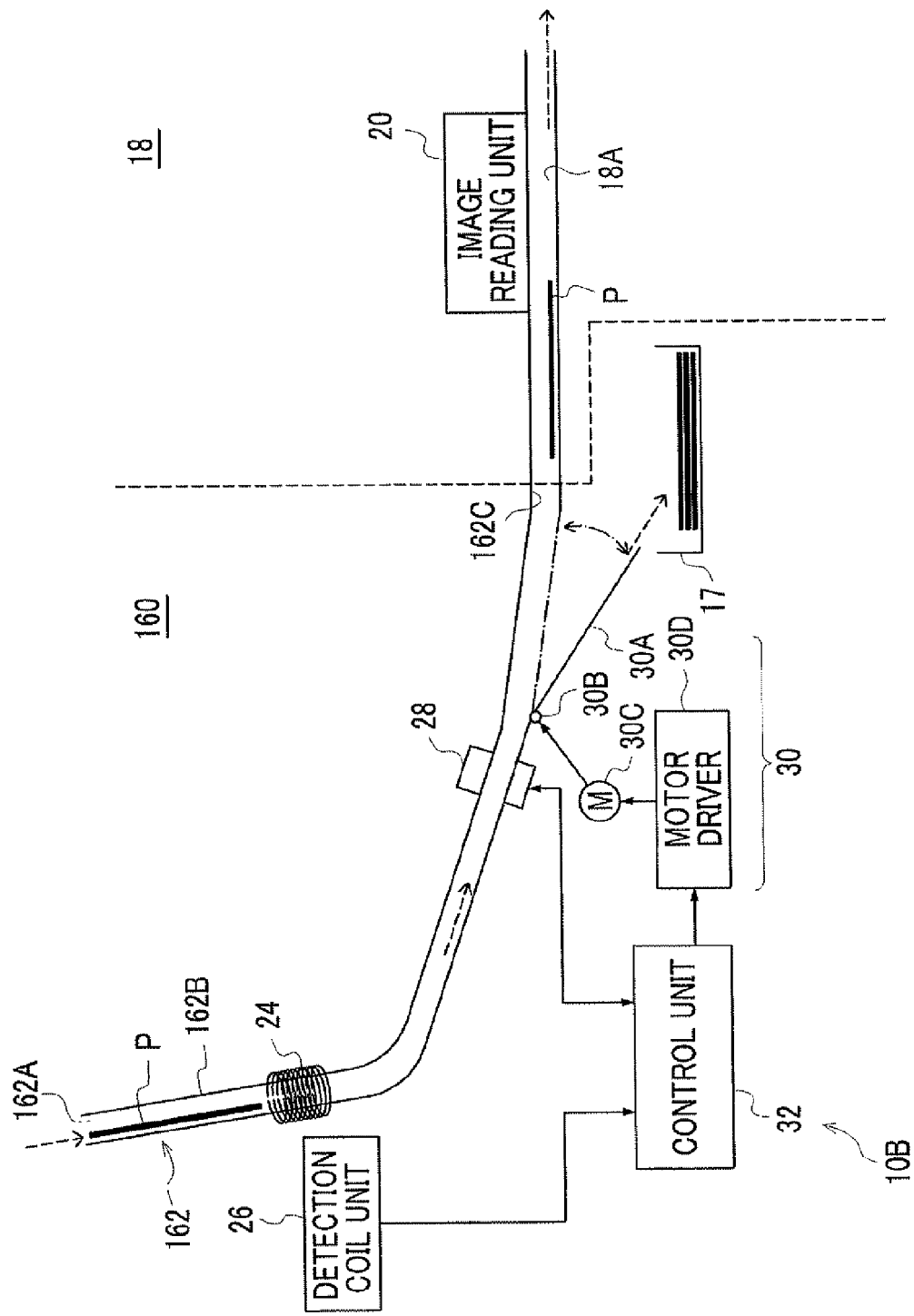
FIG. 7 is a diagram illustrating the partial configuration of an image processing system according to a second exemplary embodiment of the invention.

FIG. 7 is a diagram illustrating the partial configuration of an image processing system 10B according to the second exemplary embodiment. As shown in FIG. 7, the image processing system 10B according to the second exemplary embodiment is different from the image processing system 10 according to the first exemplary embodiment, in that a sheet identifying apparatus 160 is used instead of the sheet identifying apparatus 16. The sheet identifying apparatus 160 is different from the sheet identifying apparatus 16 according to the first exemplary embodiment, in that a sheet input and output unit 162 is used instead of the sheet input and output unit 22. The sheet input and output unit 162 includes an input port 162A into which a sheet P is inserted from the outside, a guide passage 162B that communicates with the input port 162A and that guides the sheet P inserted into the input port 162A to the image processing apparatus 18, and an output port 162C that communicates with the guide passage 162B and the reading region 18A of the image processing apparatus 18 and that discharges the sheet P guided by the guide passage 162E to the reading region 18A.

The guide passage 162B according to the second exemplary embodiment is different from the guide passage 22B according to the first exemplary embodiment, in that the guide passage 22B is formed in a straight line shape from the detection region of the excitation coil 24 to the detection region of the photo sensor 28 but the guide passage 162B is formed in an S-shape of C-shape pattern from the detection region of the excitation coil 24 to the detection region of the photo sensor 28. That is, the guide passage 162B according to the second exemplary embodiment roughly includes an upstream region including the detection region of the excitation coil 24 and a downstream region including the detection region of the photo sensor 28. The upstream region is formed to be steeper than the corresponding upstream region in the guide passage 22B according to the first exemplary embodiment, and the downstream region is sloped down from the inflection point with the upstream region to the output port 162C so as to hand over the sheet P sliding down from the upstream region to the image processing apparatus 18.

In the sheet identifying apparatus 160 having the above-mentioned configuration, a sheet P is inserted into the input port 162A from the upside of the sheet identifying apparatus 160, but the length in the vertical direction (height) of the sheet identifying apparatus 160 is set to be smaller than that in the case where the guide passage is formed in a straight line shape substantially in the vertical direction from the input port to the output port, thereby contributing to the decrease in size of the entire apparatus. Since the speed of the sheet P passing through the downstream region is lower than that of the sheet passing through the upstream region, the erroneous detection in the photo sensor 28 is suppressed in comparison with the case where the guide passage is formed in a straight line shape substantially in the vertical direction from the input port to the output port. Since the upstream region of the guide passage 162B is sloped steeper than the upstream region of the guide passage 22B according to the first exemplary embodiment, the sheet P inserted into the input port 162A is more greatly affected by its own weight in comparison with the first exemplary embodiment. Therefore, since the sheet P slides down the guide passage 162B faster than in the first exemplary embodiment, a situation in which the sheet is stopped in the midway is suppressed.

Third Exemplary Embodiment

The image processing system 10 (10B) is described in the first and second exemplary embodiments, but a sheet shredding system 200 is described in a third exemplary embodiment of the invention. In the third exemplary embodiment, the same elements as those of the first and second exemplary embodiments are referenced by the same reference numerals and signs and the description thereof will not be repeated. Elements different from those of the first and second exemplary embodiments will be described below.

Figure 8:
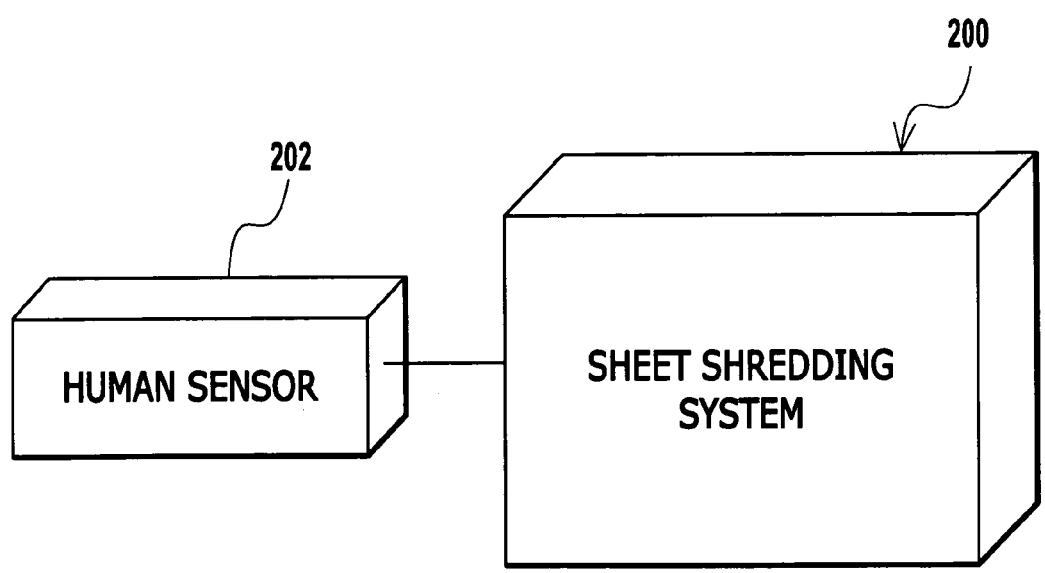
FIG. 8 is a diagram schematically illustrating the configuration of a sheet shredding system according to a third exemplary embodiment of the invention and the periphery thereof.

FIG. 8 is a diagram schematically illustrating the configuration of the sheet shredding system 200 according to the third exemplary embodiment and the peripheral configuration thereof. The sheet shredding system 200 shown in FIG. 8 has a so-called shredder function of shredding a sheet P. The sheet shredding system 200 also has a human sensing function of sensing a person approaching the sheet shredding system 200 so as to prevent erroneous shredding (erroneous discard) of a confidential sheet P. In order to realize the human sensing function, a human sensor 202 is electrically connected to the sheet shredding system 200. The human sensor 202 outputs a sensing signal when sensing a person approaching the sheet shredding system 200. In the third exemplary embodiment, a piezoelectric mat (a mat having a single piezoelectric sensor or plural piezoelectric sensors built therein) disposed on the floor within a radius of, for example, 1 m centered about the sheet shredding system 200 is used as the human sensor 202, but a photo sensor detecting a person approaching the sheet shredding system 200 may be used without being limited to the piezoelectric mat. In this case, the photo sensor may be disposed at a position through which a user has to pass to perform an operation of starting the shredding of a sheet P by the use of the sheet shredding system 200. In this way, the human sensor 202 has only to be disposed at a position temporally matched with the detection supplied to prevent the erroneous shredding of a confidential sheet P in consideration of users' behavior patterns.

Figure 9:
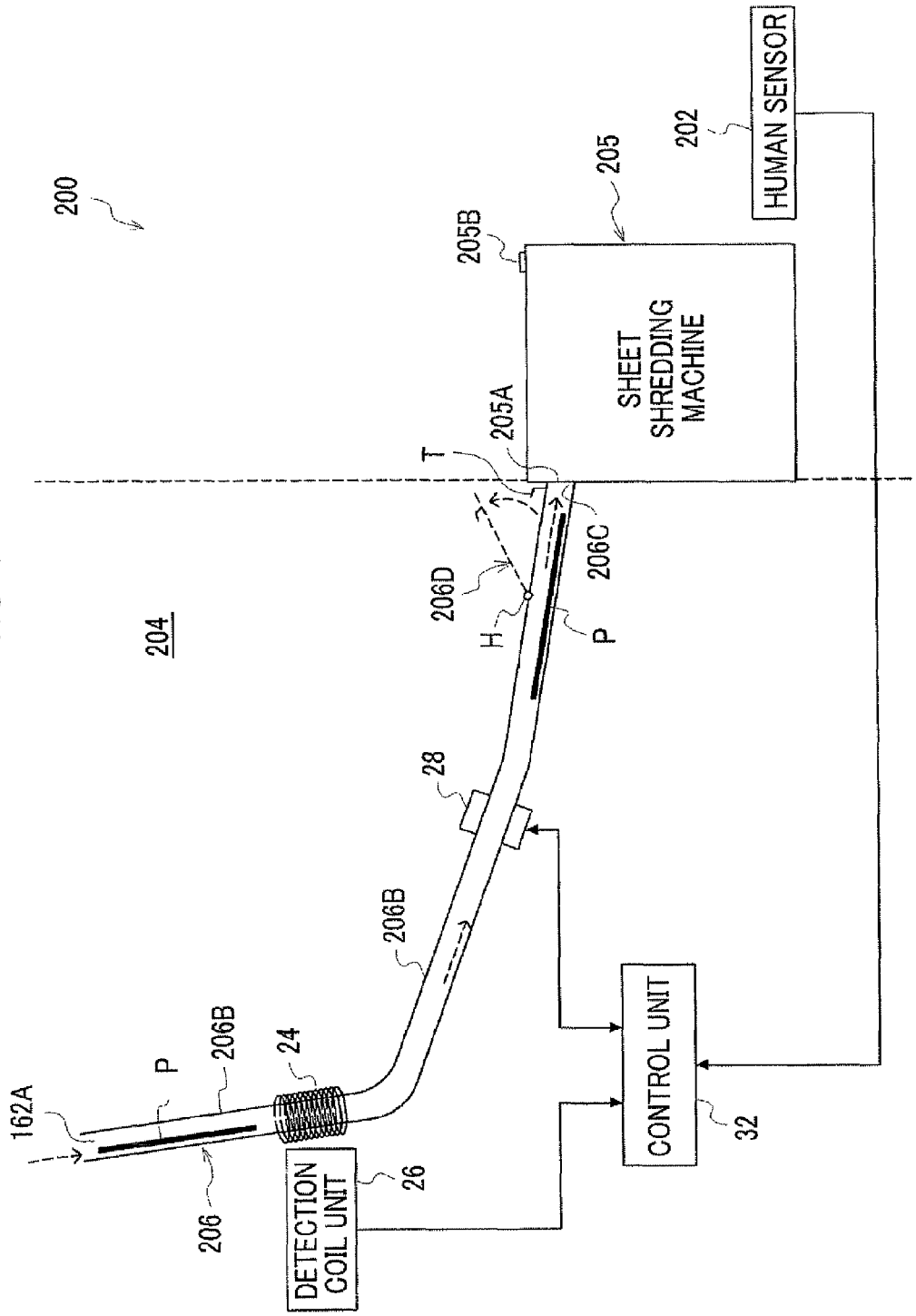
FIG. 9 is a diagram illustrating the partial configuration of the sheet shredding system according to the third exemplary embodiment.

FIG. 9 is a diagram illustrating the partial configuration of the sheet shredding system 200 according to the third exemplary embodiment. As shown in FIG. 9, the sheet shredding system 200 includes a sheet identifying apparatus 204 and the sheet shredding machine 205. The sheet identifying apparatus 204 is different from the sheet identifying apparatus 160 according to the second exemplary embodiment, in that a sheet input and output unit 206 is used instead of the sheet input and output unit 162. The sheet input and output unit 206 is different from the sheet input and output unit 162 according to the second exemplary embodiment, in that the sheet sorting device 30 is not provided and a lid 206D is further provided. The configurations of an input port 206A, a guide passage 206B, and an output port are the same as the sheet input and output unit 162 according to the second exemplary embodiment. The lid 206D forms a part of an upper wall of the guide passage 206B forming the output port in the downstream region of the guide passage 206B and is rotatably attached to the upper wall of the guide passage 206B with a hinge H interposed therebetween. A knob T is attached to the surface of the lid 206D and for example, a user may open the lid 206 by gripping the knob T and pulling up the lid 206D. For example, when a sheet P does not enter the sheet shredding machine 205 but stays in the downstream region of the guide passage 206B, the lid 206 is manually opened in order to remove the sheet from the guide passage 206B, the channel of the guide passage 206B is exposed to the outside, and the sheet P is removed from the channel of the guide passage 206B.

The guide passage 206B is disposed so that the output port 206C is in contact with a sheet introducing port 205A of the sheet shredding machine 205 and communicates with a sheet introducing section (not shown in the drawing) of the sheet shredding machine 205. In the sheet introducing section, a shutter (not shown in the drawing) preventing the introduction of a sheet P sliding down from the sheet identifying apparatus 204 into the sheet shredding machine body at the boundary is disposed between the guide passage 206B and the sheet shredding machine body actually shredding the sheet P.

A start switch 205B is disposed on the surface of the sheet shredding machine 205. When the start switch 205B is pushed, a shredding start instructing signal instructing to start the shredding is output therefrom. When a predetermined condition is satisfied and then the start switch 205B is pressed, the shutter of the sheet introducing section is opened and the shredder function is activated.

The human sensor 202 is disposed in a predetermined region (a region defined in advance as a region through which it is expected that a user should pass to use the sheet shredding machine 205) around the sheet shredding machine 205, and senses a person entering the region. Since the human sensor 202 is electrically connected to the control unit 32 via an external interface 212 to be described later, the detection result of the human sensor 202 is received by the control unit 32.

Figure 10:
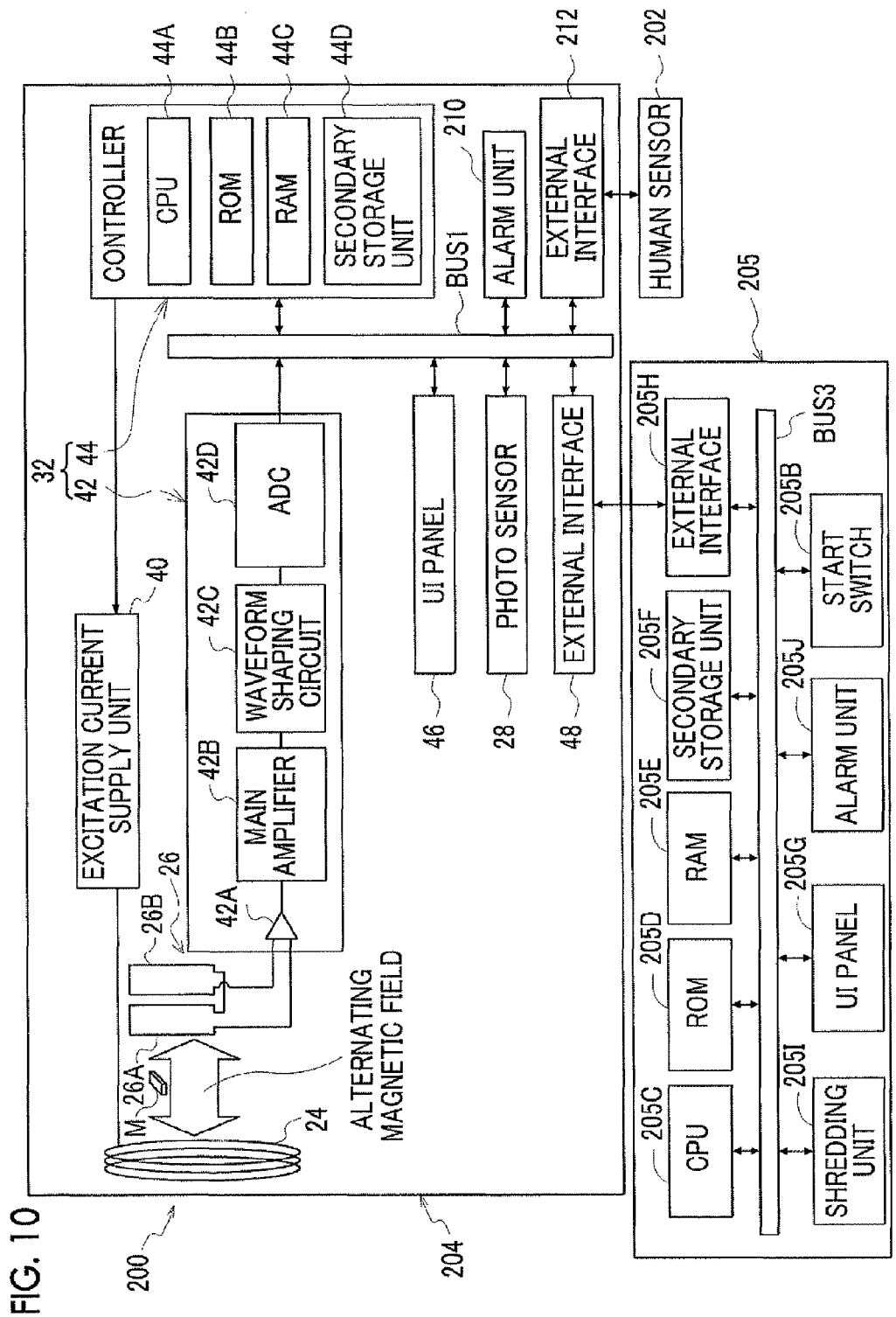
FIG. 10 is a diagram illustrating the partial configuration of an electrical system of an image processing system according to the third exemplary embodiment.

FIG. 10 is a diagram illustrating the partial electrical configuration of the sheet shredding system 200 according to the third exemplary embodiment. As shown in FIG. 10, the sheet identifying apparatus 204 is different from the sheet identifying apparatus according to the first exemplary embodiment, in that an alarm unit 210 and an external interface 212 are additionally provided. The alarm unit 210 serves to inform a user that the passing of a confidential sheet P through the guide passage 22B of the sheet identifying apparatus 204 is detected and informs the user of the passing of the confidential sheet P, for example, by lighting a warning lamp of a specific color. The external interface 60 is connected to the human sensor 202 via a communication medium such as the above-mentioned communication cable, and serves to receive information indicating the detection result of the human sensor 202 and to transmit the received information to the controller 44.

The sheet shredding machine 205 includes a CPU 205C, a ROM 205D, a RAM 205E, a secondary storage unit 205F, a UI panel 205G, an external interface 205H, a shredding unit 205I, and an alarm unit 205J. The CPU 205C controls the overall operation of the sheet shredding machine 205. The ROM 205D serves as a memory unit storing various programs or various parameters for controlling the operation of the sheet shredding machine 205 in advance. The RAM 205E is used as a work area or the like at the time of executing various programs. The secondary storage unit 205F (for example, a hard disk device) serves to store a variety of information which should be maintained even when the power switch of the machine is turned off. The UI panel 205G is constructed by a touch panel display in which a transmissive touch panel is superimposed on a display, displays a variety of information on the display surface of the display, and receives a variety of information or instructions by causing a user to touch the touch panel. The external interface 205H is connected to the sheet identifying apparatus 204 via a communication medium such as a communication cable and controls the communication with the sheet identifying apparatus 204 by receiving a variety of information from the sheet identifying apparatus 204 and transmitting a variety of information to the sheet identifying apparatus 204.

The shredding unit 205I performs a shredding operation on the sheet P received from the sheet introducing section by activating plural cutters at a high speed. Therefore, the shredder function of the sheet shredding system 200 is performed by operating the shredding unit 205I.

The alarm unit 205J serves to inform a user that a confidential sheet P stays in the sheet input and output unit 206, and informs the user that a confidential sheet P stays in the sheet input and output unit 206, for example, by lighting a warning lamp of a specific color.

The start switch 205B, the CPU 205C, the ROM 205D, the RAM 205E, the secondary storage unit 205F, the UI panel 205G, the external interface 205H, the shredding unit 205I, and the alarm unit 205J are connected to each other via a system bus BUSS. Therefore, the CPU 205C accesses the ROM 205D, the RAM 205E, and the secondary storage unit 205F, displays a variety of information on the UI panel 205G, monitors the details of a user's operation input to the start switch 205B and the UI panel 205G, receives a variety of information from the sheet identifying apparatus 204 via the external interface 205H, transmits a variety of information to the sheet identifying apparatus 204 via the external interface 205H, controls the operation of the shredding unit 205I, and controls the operation of the alarm unit 205J.

In the sheet shredding system 200 having the above-mentioned configuration, various processes for realizing the shredder function are performed by a software configuration. An example thereof is embodied by causing a computer to execute a program. However, the processes are not limited to the software configuration but may be performed by a hardware configuration or by a combination of a hardware configuration and a software configuration.

A case where the CPU 44A of the sheet identifying apparatus 204 according to the third exemplary embodiment performs the sheet identifying process by executing the program and a case where the CPU 205C of the sheet shredding machine 205 according to the third exemplary embodiment performs the sheet shredding function by executing the program will be described. In this case, a configuration in which the program of the sheet identifying process is stored in advance in the ROM 44B and a configuration in which the program of the sheet shredding process is stored in advance in the ROM 205E, or a configuration in which the program is provided in a state where it is stored in a computer-readable recording medium, or a configuration in which the program is transmitted via a wired or wireless communication medium may be employed.

Figure 11:
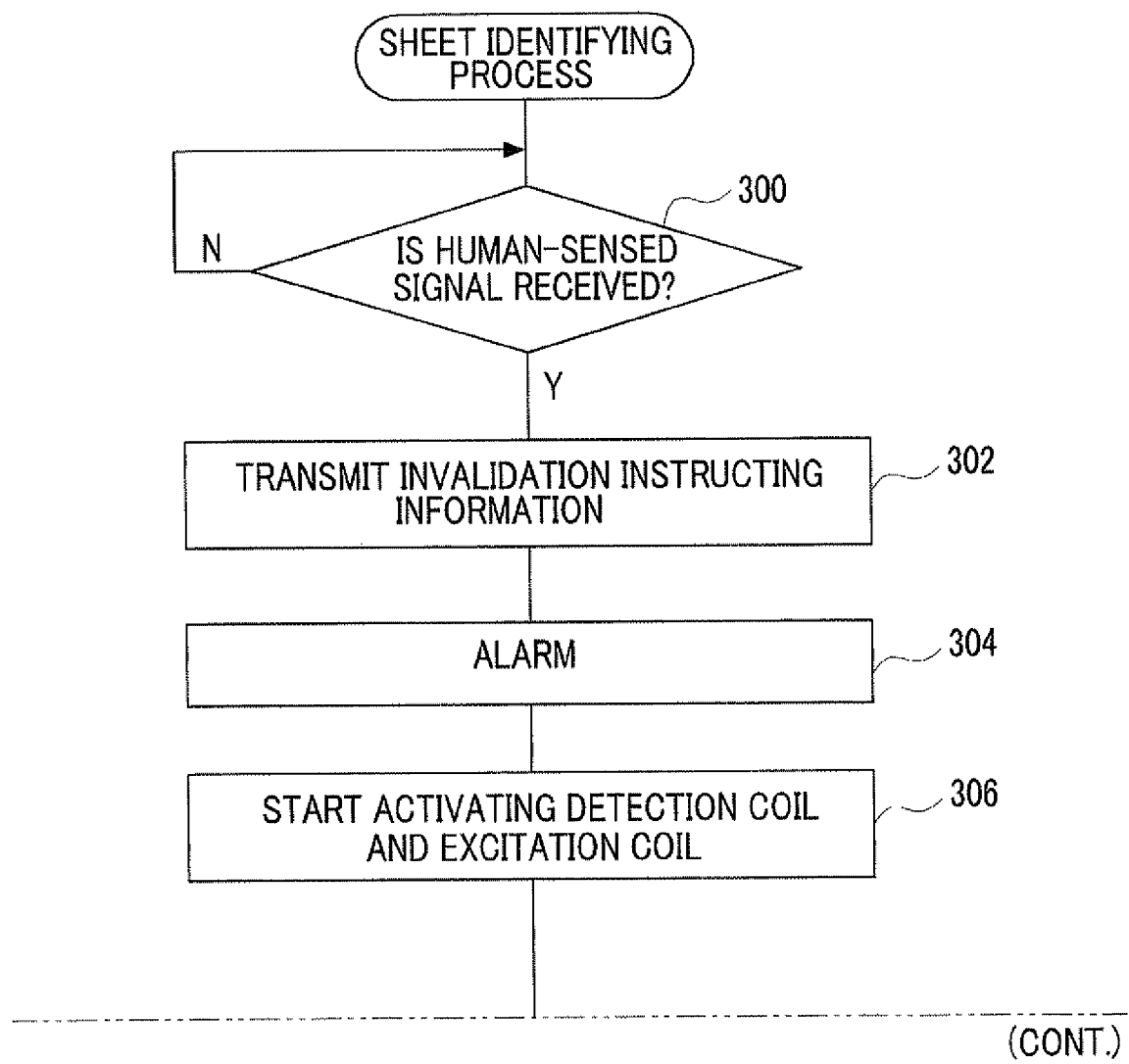
FIG. 11 is a flowchart illustrating the flow of processes of a sheet identification processing program according to the third exemplary embodiment.

FIG. 11 is a flowchart illustrating the flow of processes of the sheet identification processing program which is executed by the CPU 44A of the sheet identifying apparatus 204 when a predetermined condition (for example, a condition that an instruction to start the sheet identifying process is received by the UT panel 46) as a condition for starting the sheet identifying process according to the third exemplary embodiment is satisfied. Here, for the purpose of avoiding confusion, a state in which the lid 206D of the sheet identifying apparatus 204 is closed will be described.

In step 300 of FIG. 11, it is waited to receive the human sensing signal output from the human sensor 202. In step 302, invalidation instructing information instructing to invalidate the operation on the start switch 205B of the sheet shredding machine 205 is transmitted to the sheet shredding machine 205. In step 304, it is warned a user to avoid the shredding of a confidential sheet P by displaying a message (for example, a message of "Is any confidential sheet included in sheets to be shredded") promoting a user to check whether a confidential sheet P is not included on the UI panel 46.

In step 306, the signal processing unit 42 is controlled to start its activation so as to start the detection operation of the detection coil unit 26 and the excitation current supply unit 40 is controlled to start the supply of an excitation current to the excitation coil 24. In step 308, it is determined whether a pulse current flows in the detection coil unit 26. When the determination result is affirmative, the first detection signal indicating that a confidential sheet P (the magnetic element M) is detected is transmitted to the sheet shredding machine 205 and the alarm unit 210 is activated to inform a user that the passing of the confidential sheet P is detected in step 310, and then the process of step 318 is performed. Here, the alarm unit 210 gives an alarm for a predetermined time (for example, 5 seconds).

On the other hand, when the determination result in step 308 is negative, it is determined in step 312 whether the level of the signal output from the photo sensor 28 varies. When the determination result is negative, the process of step 308 is performed again. When the determination result is affirmative, the second detection signal indicating that a non-confidential sheet P is detected is transmitted to the sheet shredding machine 205 in step 314 and then the process of step 316 is performed.

In step 316, it is determined whether the level of the signal output from the photo sensor 28 is restored to the original level (the level before it varies). The process of step 314 is performed again when the determination result is negative and the process of step 318 is performed when the determination result is affirmative.

In step 318, it is determined whether a predetermined condition (for example, a condition that a predetermined time (for example, 30 seconds) passes after the process of step 310 is ended or after the determination result in step 316 is affirmative) as the condition for ending the sheet identification processing program is satisfied. When the determination result is negative, the process of step 308 is performed again. When the determination result is affirmative, it is controlled in step 320 to stop the activation of the signal processing unit 42 and the supply of an excitation current to the excitation coil 24, which are started in the process of step 306, and then the sheet identification processing program is ended. Finally, the sheet identification processing program is ended.

FIG. 12 is a flowchart illustrating the flow of processes of the sheet shredding processing program which is executed by the CPU 205C of the sheet shredding machine 205 when a predetermined condition (for example, a condition that the main power source of the sheet shredding machine 205 is turned on) as a condition for starting the sheet shredding process according to the third exemplary embodiment is satisfied. Here, for the purpose of avoiding confusion, a state in which the lid 206D of the sheet identifying apparatus 204 is closed will be described.

In step 350 of FIG. 12, it is determined whether the invalidation instructing information transmitted in step 302 of the sheet identification processing program according to the third exemplary embodiment is received. When the determination result is affirmative, the process of step 352 is performed. In step 352, the invalidation instructing information received in the process of step 350 is stored in a predetermined memory area of the secondary storage unit 205F and then the process of step 354 is performed.

In step 354, it is determined whether a shredding start instructing signal output from the start switch 205B is received. When the determination result is affirmative, it is determined in step 356 whether the invalidation instructing information is stored in the predetermined memory area of the secondary storage unit 205F. When the determination result is affirmative, the process of step 358 is performed.

In step 358, the shredding unit 205 is controlled to start its activation so as for the shredding unit 205 to start the operation of shredding the sheet P. Then, it is waited in step 360 until the time of ending the operation of shredding the sheet P arrives, the shredding unit 205 is controlled to stop its activation, which is started in the process of step 358, in step 362, examples of the sheet shredding program are ended. The "time of ending the operation of shredding the sheet P" used in step 360 includes a time of inputting an instruction to end the operation of shredding the sheet P to the UI panel 205G and a time in a predetermined time (for example, 30 seconds) after the process of step 358 is ended and the sheet P is received by the sheet introducing section.

On the other hand, when the determination result in step 350 is negative, it is determined in step 354 whether the first detection signal transmitted in the process of step 310 of the sheet identification processing program according to the third exemplary embodiment is received. When the determination result is negative, it is determined in step 366 whether the second detection signal transmitted in the process of step 314 of the sheet identification processing program according to the third exemplary embodiment is received. When the determination result is affirmative, the process of step 368 is performed. In step 368, it is determined whether the invalidation instructing information is stored in the predetermined memory area of the secondary storage unit 205F. The process of step 354 is performed when the determination result is negative and the process of step 370 is performed when the determination result is affirmative.

In step 370, the alarm unit 205J is activated to inform a user that a confidential sheet P stays in the guide passage 2063 of the sheet input and output unit 206, and then the process of step 372 is performed. It is waited in step 372 until a predetermined condition as a condition for erasing the invalidation instructing information from the secondary storage unit 205F is satisfied, the invalidation instructing information is erased from the predetermined memory area of the secondary storage unit 205F in step 374, and then the process of step 354 is performed. An example of the "predetermined condition" used in the process of step 372 is a condition that information indicating that the lid 206D is opened and the confidential sheet P is taken out of the guide passage 206B is input to the UI panel 205G. Another example thereof is a condition that information indicating whether a series of operations of opening and closing again the lid 206D are carried out is received. In this case, it is necessary to provide a sensor detecting the operation of opening and closing the lid 206D.

On the other hand, when the determination result in the process of step 364 is affirmative, the process of step 370 is performed. When the determination result in the process of step 366 is negative, it is determined in step 376 whether a predetermined condition (for example, a condition that a predetermined time passes after the sheet shredding program is started) as the condition for performing an error process is satisfied. When the determination result is negative, the process of step 354 is performed again. When the determination result is affirmative, the error control is performed in step 378 and then the sheet shredding program is ended. Examples of the "error process" performed in step 378 include a process of displaying a message urging a user to input a non-confidential sheet P to the sheet identifying apparatus 204 on the UI panel 205G, a process of displaying the message for a predetermined time (for example, 10 seconds), and a process of displaying a message indicating that any sheet P is not present in the guide passage 206B of the sheet input and output unit 206 at the present time on the UI panel 205G for a predetermined time (for example, 10 seconds).

Although it has been stated in the third exemplary embodiment that the human sensor 202 is disposed around the sheet shredding machine 205, the invention is not limited to this configuration but for example, the human sensor may be disposed around the image processing apparatus 18 described in the first exemplary embodiment. In this case, the image processing system 10 may be configured so as to store invalidation information for invaliding an instruction to perform the image processing function in a predetermined memory area of the secondary storage unit 56 when a user is detected by the human sensor 202 and to erase the invalidation information from the predetermined memory area of the secondary storage unit 56 to release the invalidation of the instruction to perform the image processing function only when a predetermined condition (for example, a condition that the second detection signal is received) as the condition for erasing the invalidation information from the predetermined memory area of the secondary storage unit 56 is satisfied.

Figure 13:
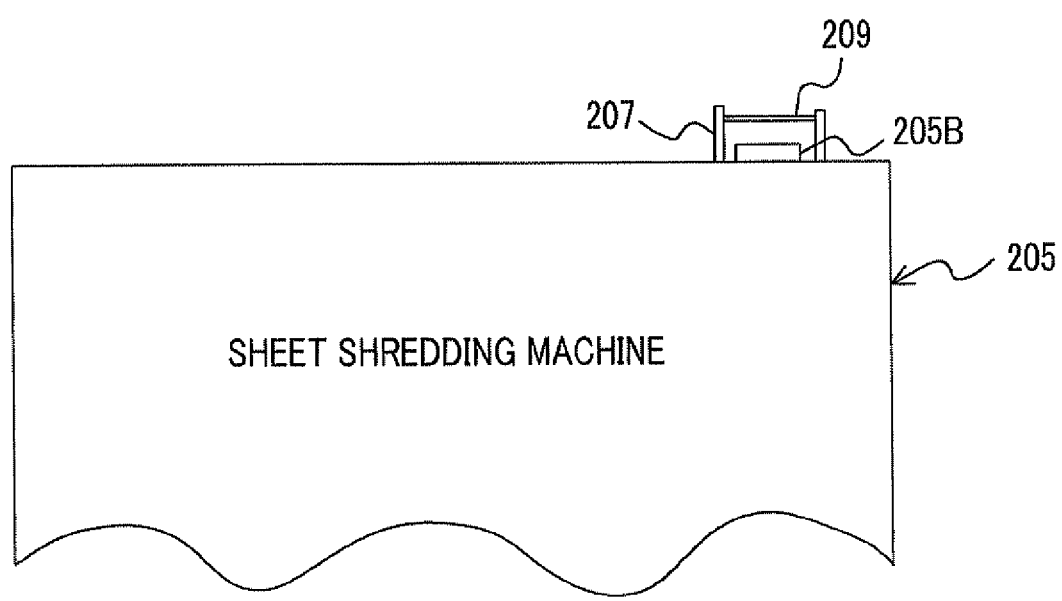
FIG. 13 is a diagram illustrating the configuration of a modification of a sheet shredding machine according to the third exemplary embodiment.

In the third exemplary embodiment, it is stated that the erroneous shredding of a confidential sheet P is prevented by invalidating the start switch 205B when the confidential sheet P stays in the guide passage 206B. However, in order to more satisfactorily prevent the erroneous shredding of a confidential sheet P, for example, an enclosure portion 207 enclosing the start switch 205B in all directions may be provided and a shutter 209 that may slide between an opened position where the start switch 205B is exposed to the outside and a closed position where the start switch 205B is covered with the enclosure portion 207 may be provided, as shown in FIG. 13. In this case, the shutter 209 is located at the closed position when the invalidation instructing information is stored in the secondary storage unit 205F, and the shutter 209 is located at the opened position to expose the start switch 205B from the enclosure portion 207 until a predetermined condition as the condition for restoring the shutter 209 to the closed position is satisfied when the invalidation instructing information is erased from the secondary storage unit 205F.

Although the authentication function is not applied to the third exemplary embodiment, the authentication function may be applied. The user identification information used in the authentication function may be stored as a log in the secondary storage unit 205F and who to shred a confidential sheet P may be specified later.

Although destinations of a confidential sheet P and a non-confidential sheet P are not changed in the third exemplary embodiment, the sheet sorting device 30 may be applied to the sheet identifying apparatus 204 of the sheet shredding system 200 as described in the first and second exemplary embodiments. In this case, it is possible to easily exclude a confidential sheet P from sheets to be shredded, compared with the configuration not including the sheet sorting device 30.

The photo sensor 28 is employed in the above-mentioned exemplary embodiments, but the invention is not limited to this configuration. For example, a detection unit that detects a sheet P using a characteristic of the sheet P without depending on the detection of a magnetic element M may be employed. Examples of the characteristic of a sheet P include water content, salt content, sugar content, electrostatic charge, and electrical insulation capacity. In this case, sensors detecting such physical properties may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sheet identifying apparatus for detecting at least one of a magnetic element in a sheet and a predetermined condition of the sheet, the sheet identifying apparatus comprising:
a passage having an input port through which the sheet is inserted;
an excitation coil disposed downstream of the input port and wound on an outer periphery of at least a portion of the passage;
a first output unit that detects magnetization variation of the magnetic element in a first region of the passage based on excitation of the excitation coil, wherein an AC current is applied to the excitation coil, and the first output unit outputs a first detection signal when the magnetization variation is detected; and
a second output unit that detects that the sheet passes through a second region in the passage on the basis of a characteristic of the sheet without using the magnetic element and that outputs a second detection signal when detecting that the sheet passes through the second region.

2. The sheet identifying apparatus according to claim 1, wherein a distance in a sheet passing direction between the first region and the second region is equal to or greater than a predetermined longitudinal length of a predetermined sheet.

3. The sheet identifying apparatus according to claim 1, wherein the passage is configured such that the sheet travels from the first region to the second region and to an end portion of the passage based on a weight of the sheet.

4. The sheet identifying apparatus according to claim 2, wherein the passage is configured such that the sheet travels from the first region to the second region and to an end portion of the passage based on a weight of the sheet.

5. An image reading system comprising:
the sheet identifying apparatus according to claim 1; and
an image reader that receives a sheet identified as a sheet not having the magnetic element by the sheet identifying apparatus and that reads an image of the received sheet.

6. The image reading system according to claim 5, wherein a distance in a sheet passing direction between the first region and the second region is equal to or greater than a predetermined longitudinal length of a predetermined sheet.

7. The image reading system according to claim 5, wherein the passage is configured such that the sheet travels from the first region to the second region and to an end portion of the passage based on a weight of the sheet.

8. A sheet shredding system comprising:
the sheet identifying apparatus according to claim 1; and
a sheet shredding machine that receives a sheet identified as a sheet not having the magnetic element by the sheet identifying apparatus and that shreds the received sheet.

9. The sheet shredding system according to claim 8, wherein a distance in a sheet passing direction between the first region and the second region is equal to or greater than a predetermined longitudinal length of a predetermined sheet.

10. The sheet shredding system according to claim 8, wherein the passage is configured such that the sheet travels from the first region to the second region and to an end portion of the passage based on a weight of the sheet.

11. The sheet identifying apparatus according to claim 1, wherein the excitation coil is disposed upstream of a center of the guide passage and the second output unit is disposed downstream of the excitation coil.

12. The sheet identifying apparatus according to claim 1, wherein the first region includes a region in which the excitation coil is disposed.

13. A non-transitory computer-readable medium storing a program causing a computer to execute a sheet identifying process for detecting at least one of a magnetic element in a sheet and a predetermined condition of the sheet, the process comprising:
inserting the sheet into an input port of a passage having an excitation coil wound around at least a portion of the passage;
detecting magnetization variation of the magnetic element in a first region of the passage based on excitation of the excitation coil, wherein an AC current is applied to the excitation coil and outputting a first detection signal when the magnetization variation is detected; and
detecting that the sheet passes through a predetermined region downstream of the first region in the passage on the basis of a characteristic of the sheet without using the magnetic element and outputting a second detection signal when detecting that the sheet passes through the predetermined region.

14. A sheet identifying method for detecting at least one of a magnetic element in a sheet and a predetermined condition of the sheet, the method comprising:
inserting the sheet into an input port of a passage having an excitation coil wound around at least a portion of the passage;
detecting magnetization variation of the magnetic element in a first region of the passage based on excitation of the excitation coil, wherein an AC current is applied to the excitation coil and outputting a first detection signal when the magnetization variation is detected; and
detecting that the sheet passes through a region downstream of the first region in the passage on the basis of a characteristic of the sheet without using the magnetic element and outputting a second detection signal when detecting that the sheet passes through the region downstream of the first region.

15. The sheet identifying method according to claim 14, wherein a distance in a sheet passing direction between the first region and the region downstream of the first region is equal to or greater than a predetermined longitudinal length of a predetermined sheet.

16. The sheet identifying method according to claim 14, wherein the passage is configured such that the sheet travels from the first region to the region downstream of the first region and to an end portion of the passage based on a weight of the sheet.

* * * * *